United States Patent
Childs et al.

(10) Patent No.: US 8,122,294 B2
(45) Date of Patent: Feb. 21, 2012

(54) APPARATUS, SYSTEM, AND METHOD FOR RAPID GRADING OF COMPUTER STORAGE OPERATING CONDITION

(75) Inventors: Philip Lee Childs, Raleigh, NC (US); Jeffrey R. Hobbet, Holly Springs, NC (US); Michael Terrell Vanover, Raleigh, NC (US)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 205 days.

(21) Appl. No.: 12/263,962

(22) Filed: Nov. 3, 2008

(65) Prior Publication Data
US 2010/0115345 A1    May 6, 2010

(51) Int. Cl.
*G06F 11/00* (2006.01)
(52) U.S. Cl. .......... 714/42; 714/57; 714/30; 714/49; 714/43; 714/48; 714/704; 709/213; 360/31
(58) Field of Classification Search .......... 714/30, 714/43, 49, 57, 25, 4; 709/213; 360/31
See application file for complete search history.

(56) References Cited

U.S. PATENT DOCUMENTS

| | | | | |
|---|---|---|---|---|
| 5,090,014 A * | 2/1992 | Polich et al. | | 714/26 |
| 5,422,890 A * | 6/1995 | Klingsporn et al. | | 714/723 |
| 6,058,494 A * | 5/2000 | Gold et al. | | 714/42 |
| 6,467,054 B1 * | 10/2002 | Lenny | | 714/42 |
| 7,215,619 B1 * | 5/2007 | Van Den Enden | | 369/53.15 |
| 2002/0036850 A1 * | 3/2002 | Lenny et al. | | 360/31 |
| 2002/0060868 A1 * | 5/2002 | Lenny et al. | | 360/31 |
| 2005/0010843 A1 * | 1/2005 | Iwamitsu et al. | | 714/724 |
| 2005/0102567 A1 * | 5/2005 | McGuire et al. | | 714/25 |
| 2006/0025965 A1 * | 2/2006 | Freeman et al. | | 702/183 |
| 2006/0259814 A1 * | 11/2006 | Korhonen | | 714/10 |
| 2008/0104387 A1 * | 5/2008 | Owhadi et al. | | 713/2 |
| 2009/0083580 A1 * | 3/2009 | Postage et al. | | 714/34 |

OTHER PUBLICATIONS

Compaq, "Self-Monitoring Analysis and Reporting Technology (S.M.A.R.T.)", Jan. 4, 1996, Quantum Corporation, SFF-8035i Rev. 2.0, p. 1-24.*

Weissel, "Self-Learning Hard Disk Power Managment for Mobile Devices", 2006, http://citeseerx.ist.psu.edu/viewdoc/summary?doi=10.1.1.69.1045, p. 1-8.*

* cited by examiner

*Primary Examiner* — Robert Beausoliel, Jr.
*Assistant Examiner* — Jeison C Arcos
(74) *Attorney, Agent, or Firm* — Kunzler Needham Massey & Thorpe

(57) ABSTRACT

An apparatus, system, and method are disclosed for rapidly grading the operating condition of computer storage. A storage log module 312 logs error information regarding any error in a storage subsystem 302 that occurs during normal operation. A storage test module 314 performs a cursory check 318 of the storage subsystem 302 as requested by a user. A storage diagnostic module 316 grades the storage subsystem 302 on an operating condition scale based at least in part upon the error information logged and upon results of the cursory check 318. In one embodiment, the storage subsystem 302 is graded as pristine if no error has been logged and no error was detected by the cursory check 318, as potentially failing if any error has been logged but no error was detected by the cursory check 318, and as failing if any error was detected by the cursory check 318.

24 Claims, 7 Drawing Sheets

APPARATUS, SYSTEM, AND METHOD FOR RAPID GRADING OF COMPUTER STORAGE OPERATING CONDITION

BACKGROUND OF THE INVENTION

1. Field of the Invention

This invention relates to computer storage and more particularly relates to storage diagnostics.

2. Description of the Related Art

As the density and capacity of computer storage technology continues to grow exponentially, the time required for testing a storage subsystem, even a single hard disk drive in a notebook computer, may become quite lengthy. This may be acceptable for factory testing, but poses a significant problem for customer service in the field.

When a customer calls in to a customer support team and suspects a problem with the hard disk drive it is often a very difficult and lengthy process to determine if a drive is good. It is much simpler to determine if a drive is really bad. If a drive is particularly bad it can be called bad at the first test that fails. To be able to call a drive good requires that one successfully complete all of the possible tests, including a full read scan, which can take hours on large capacity drives. This is an unacceptable length of time and often drives up the No Defect Found ("NDF") rates (around 30%) because the customer is not willing to wait the hours to determine that the drive is good.

The existing solution is to rely only on a cursory check to decide if the drive is good. The cursory check takes a few minutes and is fairly accurate (around 90%) but there is still another 10% of the bad drives being called good that should have been replaced. The problem is that for this 10% the customer is being told that the drive is good when it is actually bad. It has a large impact on customer satisfaction when they have to call back multiple times for the same problem.

SUMMARY OF THE INVENTION

From the foregoing discussion, it should be apparent that a need exists for an apparatus, system, and method that rapidly grades the operating condition of computer storage. Beneficially, such an apparatus, system, and method would provide higher accuracy with minimal user wait time.

The present invention has been developed in response to the present state of the art, and in particular, in response to the problems and needs in the art that have not yet been fully solved by currently available storage diagnostics. Accordingly, the present invention has been developed to provide an apparatus, system, and method for grading storage operating condition that overcome many or all of the above-discussed shortcomings in the art.

The apparatus to grade storage operating condition is provided with a plurality of modules configured to functionally execute the necessary steps of testing the storage, logging the test results, and diagnosing the storage operating condition upon the basis of the results. These modules in the described embodiments include a storage log module, a storage test module, and a storage diagnostic module.

The apparatus, in one embodiment, is configured to log error information regarding any error in a storage subsystem that occurs during normal operation of the storage subsystem, perform a cursory check of the storage subsystem as requested by a user, and grade the storage subsystem on an operating condition scale having at least three grades, the grades based at least in part upon the error information logged and upon results of the cursory check.

The apparatus is further configured, in one embodiment, to grade the storage subsystem as pristine if no error has been logged and no error was detected by the cursory check, as potentially failing if any error has been logged but no error was detected by the cursory check, and as failing if any error was detected by the cursory check. The duration of the cursory check is typically on the order of several minutes. By augmenting the diagnosis with the error information logged, both the NDF rate (good called bad) and the customer callback rate (bad called good) may be reduced significantly with a negligible increase in the time required beyond that of running the cursory check.

In a further embodiment, the apparatus may be configured to perform a comprehensive test of the storage subsystem, including a full media test, upon request by the user if the storage subsystem was graded as potentially failing. If the user accepts the additional hour or more required to run the comprehensive test in that case, the NDF rate may be reduced even further.

A system of the present invention is also presented to include a variety of storage subsystems and computers upon which to run the foregoing modules. In particular, the system, in one embodiment, includes a storage subsystem comprised of one or more hard drives. The storage test module may further check adjacent media for errors during normal operation of the storage subsystem, or patrol the storage subsystem during normal operation such that a full media test is repeatedly performed in a piecemeal fashion over time.

The system may be embodied by a mobile computer. The system may further include a variable rate of storage patrolling, which is reduced when the computer is operating on battery power or when motion of the computer is detected.

A method of the present invention is also presented for grading storage operating condition. The method in the disclosed embodiments substantially includes the steps necessary to carry out the functions presented above with respect to the operation of the described apparatus and system. In one embodiment, the method includes logging error information regarding any error in a storage subsystem that occurs during normal operation of the storage subsystem, performing a cursory check of the storage subsystem as requested by a user, and grading the storage subsystem on an operating condition scale having at least three grades, the grades based at least in part upon the error information logged and upon results of the cursory check. The cursory check may include basic operational testing of the storage subsystem and a partial media test. The method also may include performing a comprehensive test of the storage subsystem, including a full media test, upon request by the user if the storage subsystem was graded as potentially failing.

In a further embodiment, the method includes checking adjacent media for errors during normal operation of the storage subsystem, or patrolling the storage subsystem during normal operation such that a full media test is repeatedly performed in a piecemeal fashion over time.

The method may also employ one or more heuristics based upon the error information logged, to improve the precision and accuracy of grading the operating condition. In one embodiment, a heuristic may infer a poorer operating condition of the storage subsystem if the error information logged exhibits a repeated failure Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
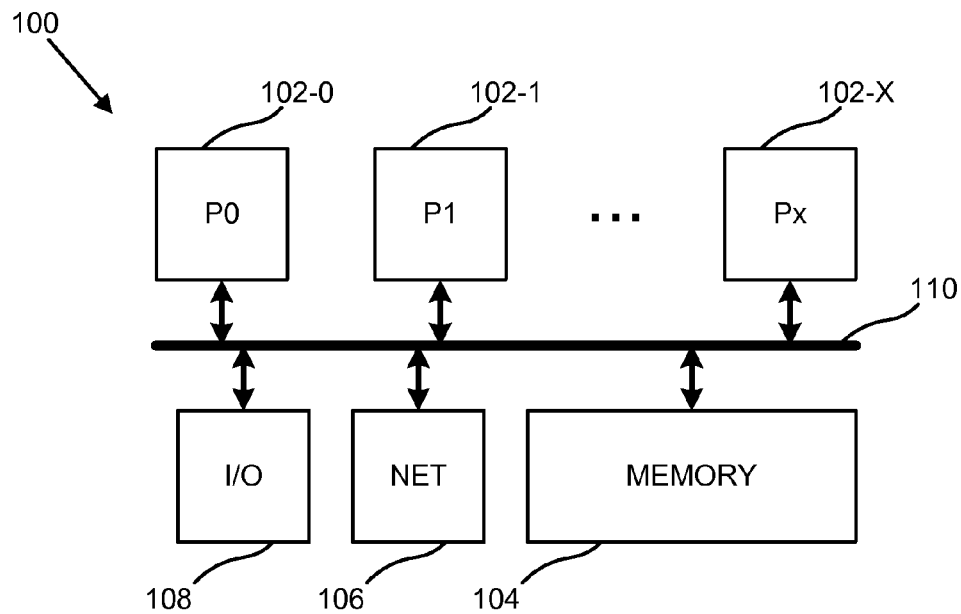
FIG. 1 is a schematic block diagram illustrating a possible computer hardware platform upon which the present invention may be at least in part deployed.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 illustrates a possible computer hardware platform 100 upon which the present invention may be at least in part deployed. The hardware platform 100 may include processor(s) 102, memory 104, a network interface 106, and an I/O (Input/Output) device interface 108, connected through a bus 110.

The hardware platform 100 may be of any form factor or type, including an embedded system, a handheld, a notebook, a personal computer, a minicomputer, a server, a mainframe, a supercomputer, and the like.

The processor(s) 102 may be present in any quantity, including a uniprocessor, and may have any instruction set architecture. In an embodiment, the processor(s) 102 may have one or more levels of dedicated or shared caches. Possible physical implementations may include multi-chip, single chip, multi-core, hyperthreaded processors, and the like.

The memory 104 may be of any size or organization and may include both read/write and read-only sections. It may also include both global and local sections, and may support both uniform and non-uniform access. It may incorporate memory-mapped I/O and direct memory access. It may support cache coherency, including directory-based and snoop-based protocols.

The network interface 106 may support any network protocol or architecture. It may support both wireless and hard-wired network connections. It may comprise Ethernet, Token Ring, System Network Architecture ("SNA"), and the like. In one embodiment, it may be integrated with the I/O device interface 108.

The I/O device interface 108 may be driven primarily by the processor(s) 102 or may incorporate an independent I/O processor subsystem. It may comprise Peripheral Component Interconnect ("PCI"), Small Computer System Interface ("SCSI"), Fiberchannel ("FC"), Enterprise System Connection ("ESCON"), ESCON over Fiberchannel ("FICON"), and the like. In an embodiment, it may include dedicated local I/O devices.

The bus 110 may comprise one or more of a variety of physical and logical topologies. It may be parallel or serial. It may be unidirectional or bidirectional. It may be flat or hierarchical. It may comprise a full or partial crossbar. It may comprise multiple bridged busses. In an embodiment, the bus 110 may comprise a high-speed internal network.

Figure 2:
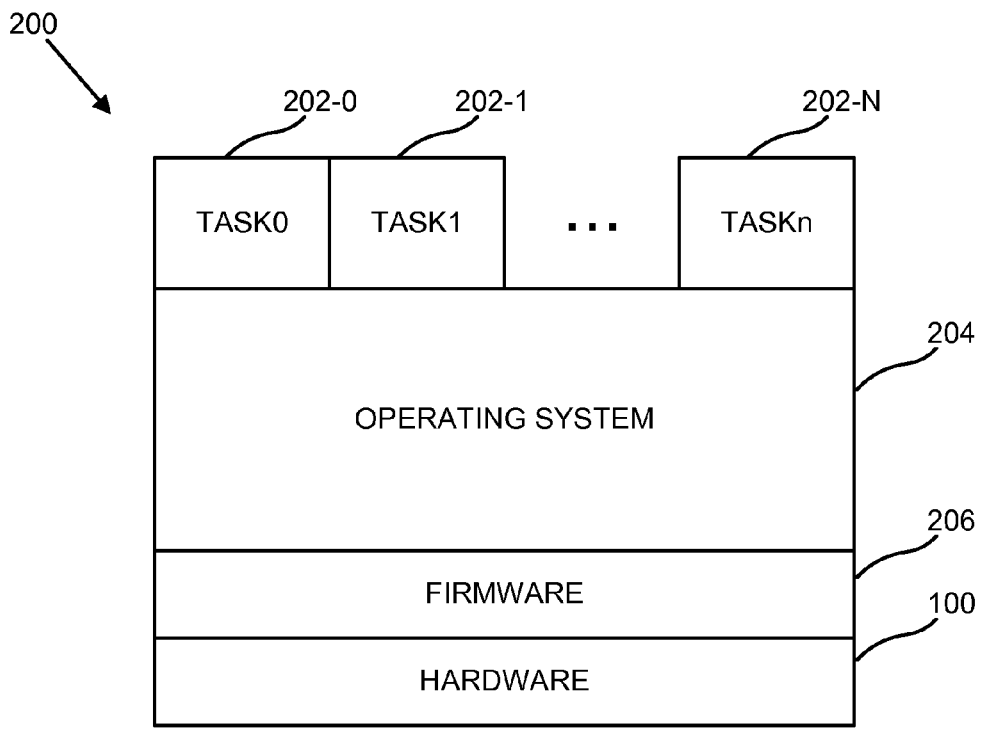
FIG. 2 is a schematic block diagram of a possible computer including a software stack in which the present invention may at least in part reside.

FIG. 2 is a diagram of a possible computer 200 including a software stack in which the present invention may at least in part reside. The software stack may include task(s) 202, hosted on an operating system 204, enabled by firmware 206, running on a hardware platform 100 of which the configuration of FIG. 1 is representative.

The task(s) 202 may include both user- and system-level tasks. They may be interactive or batch. They may run in the foreground or background. User-level task(s) 202 may include applications, programs, jobs, middleware, and the like. System-level task(s) 202 may include services, drivers, daemons, utilities, and the like.

The operating system 204 may be of any type and version and in any state. Types may include Unix, Linux, Windows, Mac, MVS, VMS, and the like. Versions may include Windows XP, Windows Vista, and the like. States may include a degree of customization, a mode of operation, a system preparation for setup, and the like. The operating system 204 may be single-user or multi-user. It may be single-tasking or multi-tasking. In an embodiment, the operating system 204 may be real-time. In another embodiment, the operating system 204 may be embedded.

The firmware 206 may comprise microcode, which may reside in a microstore of the processor(s) 102. In an embodiment, the firmware 206 may comprise low-level software, which may reside in memory 104. In one embodiment, the firmware 206 may comprise a rudimentary operating system 204. In a further embodiment, the firmware 206 may support virtualization so as to permit the concurrent operation of multiple operating systems 204 on a hardware platform 100.

Figure 3:
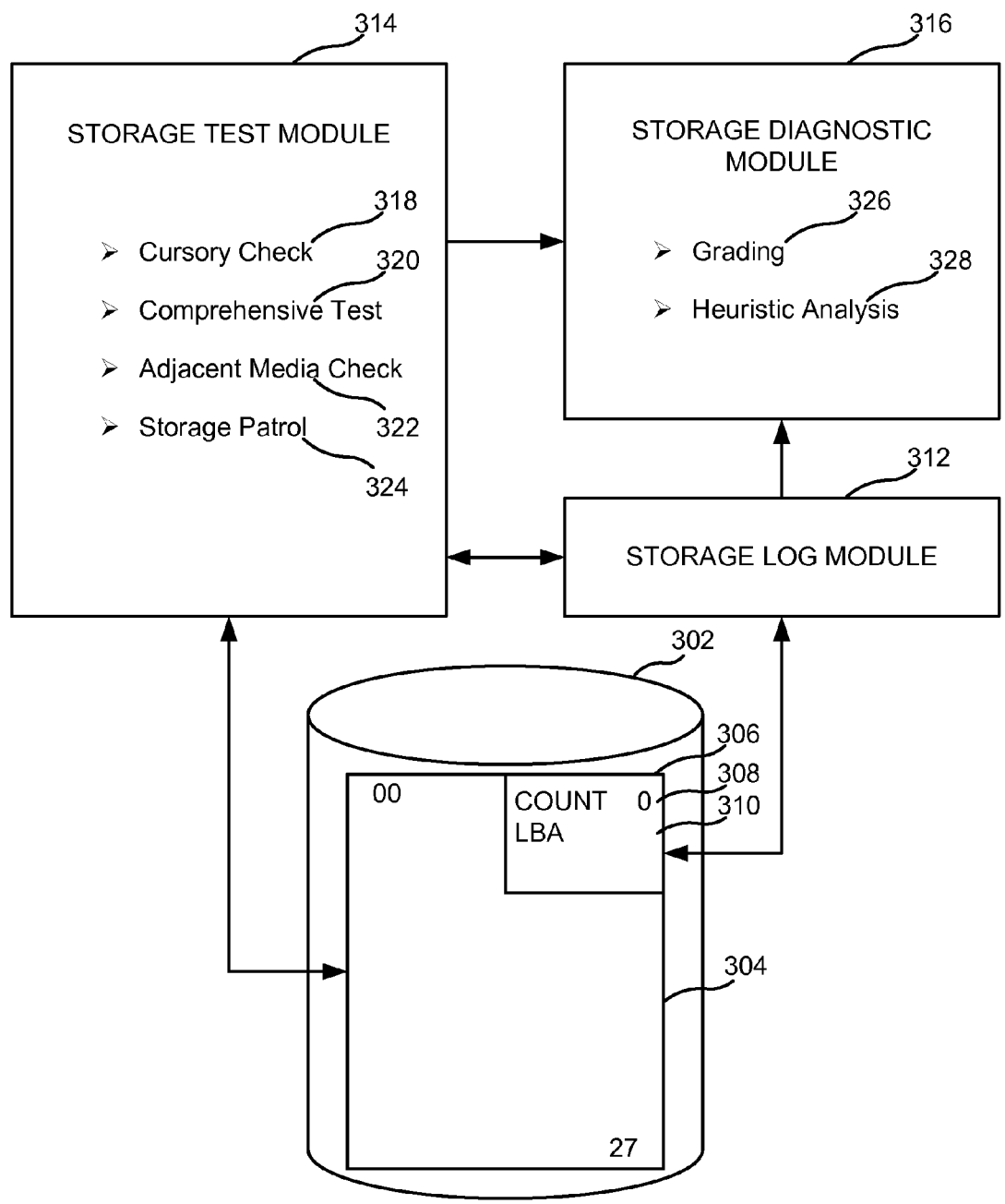
FIG. 3 is a schematic block diagram illustrating a high-level modular structure of the present invention in communication with a storage subsystem.

FIG. 3 is a schematic block diagram illustrating a high-level modular structure of the present invention in communication with a storage subsystem 302 comprising a storage area 304. For purposes of illustration, a simplified storage address range comprising 0x00 to 0x27 is shown. The storage address may also be referred to as a logical block address ("LBA").

A portion of the storage area 304 is occupied by a storage log 306, having contents comprising a storage error count 308 and a failing storage address history 310. In one embodiment, the failing storage address history 310 may comprise a list of the most recent failing storage addresses, in order of occurrence beginning with the latest. In another embodiment, the storage log 306 may comprise multiple logs, such as a self-test log, an error log, and so forth.

The contents of storage log 306 may also comprise Self-Monitoring, Analysis, and Reporting Technology (SMART) attributes, including:

rate of hardware read errors that occurred when reading data from a disk surface,
overall throughput performance of a hard disk drive,
average time of spindle spin up,
tally of spindle start/stop cycles,
count of reallocated sectors,
margin of a channel while reading data,
rate of seek errors of the magnetic heads,
average performance of seek operations of the magnetic heads,
count of hours in power-on state,
count of retry of spin start attempts,
number of times recalibration was requested,
count of full hard disk power on/off cycles,
uncorrected read errors reported to the operating system,
unsafe fly height condition is encountered,
airflow temperature,
frequency of mistakes as a result of impact loads,
number of times the heads are loaded off the media,
count of load/unload cycles into head landing zone position,
current internal temperature,
time between ECC-corrected errors,
count of remap operations,
number of unstable sectors (waiting to be remapped),
total number of uncorrectable errors when reading/writing a sector,
number of errors in data transfer via the interface cable,
total number of errors when writing a sector,
number of off-track errors,
number of data address mark errors, number of ECC errors,
number of errors corrected by software,
number of thermal asperity errors,
height of heads above the disk surface,
amount of high current used to spin up the drive,
number of buzz routines to spin up the drive,
seek performance during offline operations,
vibration during write,
shock during write,
distance the disk has shifted relative to the spindle,
number of errors resulting from externally-induced shock and vibration,
time spent operating under data load,
number of times head changes position,
resistance caused by friction in mechanical parts while operating,
total number of load cycles,
total time of loading on the magnetic heads actuator,
number of attempts to compensate for platter speed variations,
number of times the magnetic armature was retracted automatically,
amplitude of thrashing,
drive temperature,
time while head is positioning, and
number of errors while reading from a disk.

The storage log 306 is maintained by a storage log module 312. The storage test module 314 provides storage error information to the storage log module 312 which in turn logs the information into the storage log 306. The storage log module 312 may then provide the logged storage error information from the storage log 306 to a storage diagnostic module 316. The storage test module 314 may also provide storage error information directly to the storage diagnostic module 316.

The storage test module 314 may implement a number of functions for testing the storage subsystem 302. A cursory check 318 tests the basic operational functionality of the storage subsystem 302, such as servo tracking, and performs a partial test of the storage media, typically no more than one percent, by spot-checking a small number of storage locations. The duration of a cursory check 318 is typically on the order of several minutes. A comprehensive test 320 performs a complete operational test of the storage subsystem 302, including a full media test, such as a complete surface scan of a hard disk drive, requiring on the order of an hour or more to finish. An adjacent media check 322 tests media in the near vicinity of a storage location that is being accessed during normal operation, such as adjacent cylinders of a hard disk drive. A storage patrol 324 steps gradually through all of the storage locations in the storage subsystem 302 as a background operation in piecemeal fashion, thus providing a similar level of coverage as a comprehensive test 320, but without having to bring normal operations to a halt for an hour or more.

The storage diagnostic module 316 may implement a number of functions for diagnosing the operating condition of the storage subsystem. In one embodiment of the present invention, a grading 326 is performed based upon the cursory check 318 and the storage error count 308. The storage subsystem 302 is graded as pristine if no error has been logged as indicated by a zero storage error count 308 and no error was detected by the cursory check 318, as potentially failing if any error has been logged as indicated by a non-zero storage error count 308 but no error was detected by the cursory check 318, and as failing if any error was detected by the cursory check 318.

The grading 326 may be refined in terms of both precision (i.e. more than three grades) and accuracy by adopting one or more heuristics 328. In one embodiment, the heuristic 328 may infer a poorer operating condition of the storage subsystem 302 if the error information logged in the storage log 306 exhibits a repeated failure, such as the same storage address appearing multiple times in the failing storage address history 310. Through routine experimentation one of ordinary skill in the art would be able to develop other such heuristics 328 by correlating the error information logged in the storage log 306, such as the SMART attributes listed above, with results of the comprehensive test 320 across a sample population of storage subsystem 302 media, such as hard disk drives.

Figure 4:
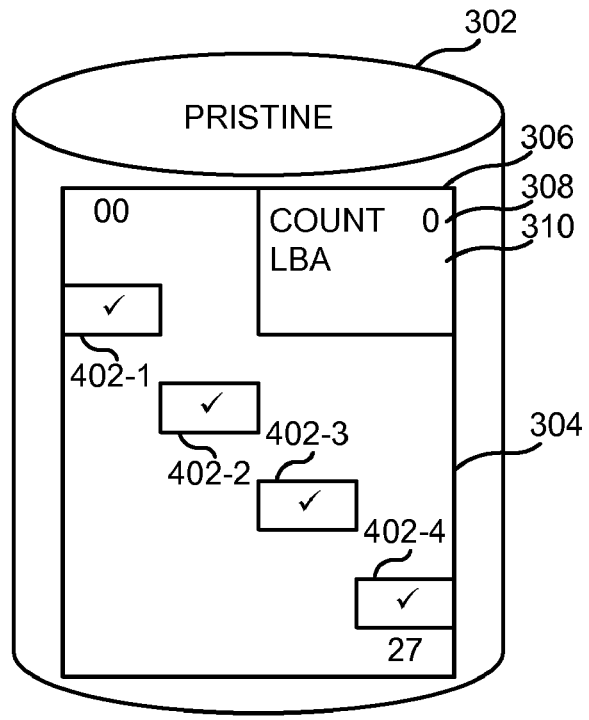
FIG. 4 is a schematic block diagram illustrating the storage subsystem in pristine operating condition.

FIG. 4 is a schematic block diagram illustrating the storage subsystem 302 in pristine operating condition. As can be seen, the storage error count 308 is zero. The cursory check 318 was successful, as indicated by the results of a partial media test comprised of successful checks 402-1 through 402-4 at storage addresses 0x08, 0x11, 0x1a, and 0x23, respectively. Thus, the requirements for grading the operating condition as pristine have been met.

Figure 5:
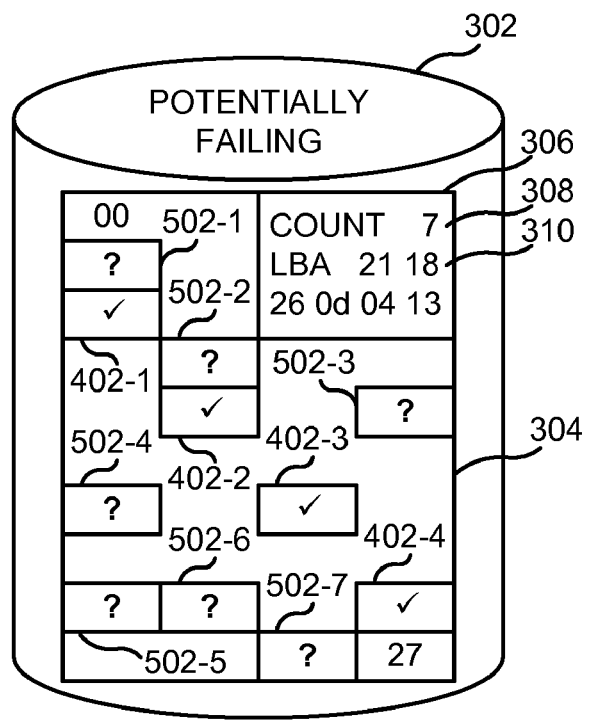
FIG. 5 is a schematic block diagram illustrating the storage subsystem in potentially failing operating condition.

FIG. 5 is a schematic block diagram illustrating the storage subsystem 302 in potentially failing operating condition. As before, cursory check 318 was successful as indicated by the successful checks 402. However, in this case the storage error count 308 is non-zero, specifically seven, representing seven potential errors 502-1 through 502-7 at storage addresses 0x04, 0x0d, 0x13, 0x18, 0x1e, 0x20, 0x21, and 0x26, respectively. Thus, the requirements for grading the operating condition as potentially failing have been met. Note that the failing storage address history 310 contains the six most recent potential errors 502, not including potential error 502-5 at storage address 0x20, which therefore must have been the first potential error to occur among the seven, none of which occurred more than once.

Figure 6:
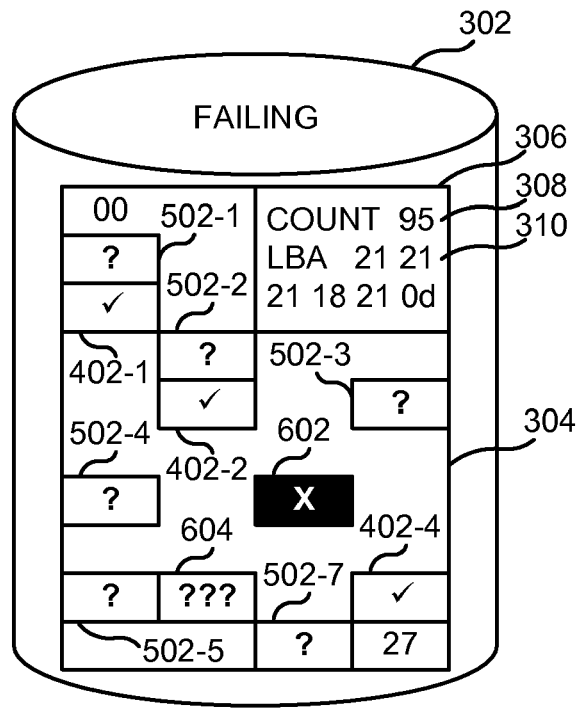
FIG. 6 is a schematic block diagram illustrating the storage subsystem in failing operating condition as determined by a cursory check.

FIG. 6 is a schematic block diagram illustrating the storage subsystem 302 in failing operating condition as determined by a cursory check 318. As can been seen, the cursory check 318 was not successful this time, because the partial media test experienced a failing check 602, thus meeting the requirement for grading the operating condition as failing. In this case, the contents of the storage log 406 would be ignored.

Had the cursory check 318 been successful, then the storage log 306 would have been consulted, resulting in an operating condition grade of potentially failing. In this case, note that the storage error count is 95, an order of magnitude higher than its previous value of seven. One or more heuristics 328 might be employed in this case to analyze the storage error information in the storage log 306 to further refine the precision and accuracy of the operating condition grade. In the example shown, the storage address 0x21 appears quite frequently in the failing storage address history 310. Specifically, it appears four out of six times, including the three most recent occurrences. A heuristic 328 could thereby infer that a likely potential error 604 exists at storage address 0x21, even if the cursory check 318 had been successful. In such a case, the operating condition could be downgraded to likely failing, a poorer operating condition than potentially failing, but not as poor an operating condition as failing.

Figure 7:
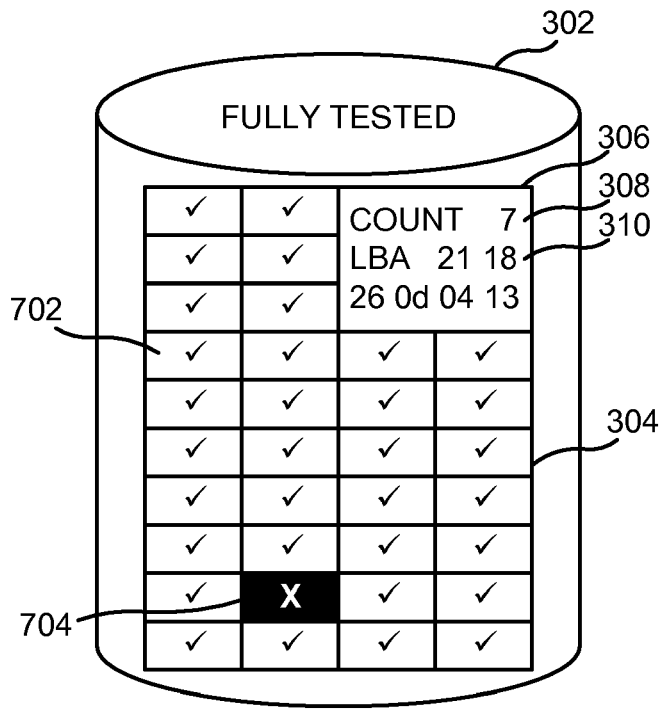
FIG. 7 is a schematic block diagram illustrating the storage subsystem in failing operating condition as determined by a comprehensive test.

FIG. 7 is a schematic block diagram illustrating the storage subsystem 302 in failing operating condition as determined by a comprehensive test 320, as might be requested by a user if the storage subsystem 302 had been previously graded as potentially failing, in order to determine the operating condition with greater certainty. As shown, the comprehensive test comprises a full media check, as indicated by successful checks 702, and a failing check 704. It should be understood that failing checks 704 and 602 represent errors that persist in spite of recovery or reconfiguration actions that may have been attempted by the hardware platform 100, the firmware 206, the operating system 204, the storage subsystem 302, or other subsystem. Although not explicitly shown, successful checks 702 were also performed on the portion of the storage area 304 occupied by the storage log 306, which otherwise would have been unreadable.

Figure 8:
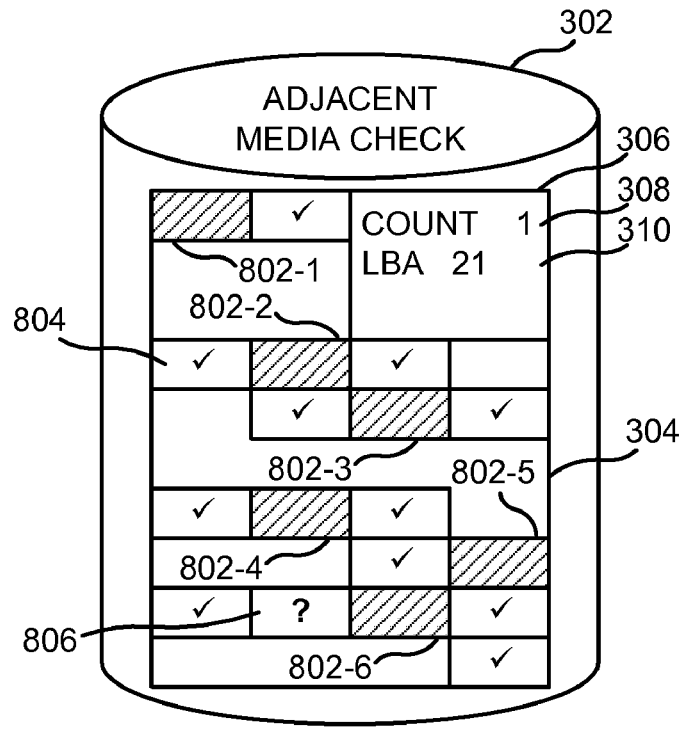
FIG. 8 is a schematic block diagram illustrating the storage subsystem in potentially failing operating condition as determined by adjacent media checking.

FIG. 8 is a schematic block diagram illustrating the storage subsystem 302 in potentially failing operating condition as determined by adjacent media checking 322. Storage accesses 802-1 through 802-6 as made during normal operation are shown at storage addresses 0x00, 0x0d, 0x12, 0x19, 0x1f, and 0x22, respectively. As can be seen, the storage address immediately preceding and the storage address immediately following each of the foregoing storage address is checked, all but one of which are found to be free of potential errors, as indicated by the successful checks 804. However, a potential error 806 is found at storage address 0x21, immediately preceding storage access 802-6, and is logged in the failing storage address history 310 within the storage log 306. Had adjacent media checking 322 not been performed, the potential error 806 would have been missed, causing the storage subsystem 302 to be graded as pristine as opposed to the more accurate grade of potentially failing. Thus adjacent media checking 322 may provide improved coverage and resultant accuracy in grading the operating condition of the storage subsystem 302, in exchange for a small increase in storage access overhead during normal operation. If combined with an existing storage cache prefetching mechanism, the overhead may be truly negligible, while improving reliability in addition to performance.

Figure 9:
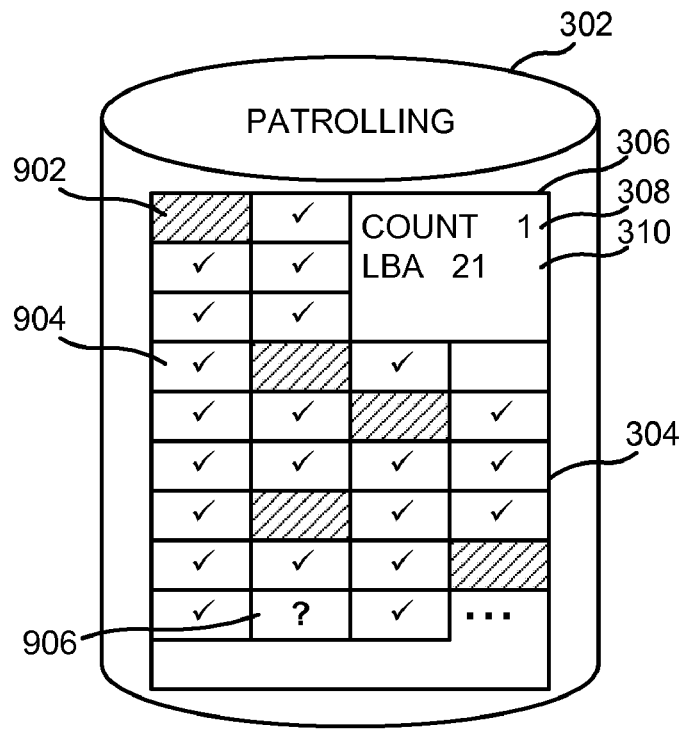
FIG. 9 is a schematic block diagram illustrating the storage subsystem in potentially failing operating condition as determined by storage patrolling.

FIG. 9 is a schematic block diagram illustrating the storage subsystem 302 in potentially failing operating condition as determined by storage patrolling 324. In one embodiment, the storage patrol 324 begins by checking for a potential error at an initial patrol address, such as 0x00, and then periodically increments the patrol address at a given rate, checking subsequent storage addresses, such as 0x01, 0x02, and so forth in piecemeal fashion, eventually wrapping back to the initial patrol address and repeating the process indefinitely in the background during normal operation, thus providing a full media test, but without having to bring normal operations to a halt for an hour or more as with a comprehensive test 320. As before, storage accesses 902 are performed in the course of normal operation, quite independent of the background storage patrolling 324. Although not explicitly shown, successful checks 904 were also performed on the portion of the storage area 304 occupied by the storage log 306 and accessed by storage accesses 902, which otherwise would have been unreadable. A potential error 906 is found at storage address 0x21, and is logged in the failing storage address history 310 within the storage log 306. Had storage patrolling 324 not been performed, the potential error 906 would have been missed, causing the storage subsystem 302 to be graded as pristine as opposed to the more accurate grade of potentially failing. Thus storage patrolling 324 may provide improved coverage and resultant accuracy in grading the operating condition of the storage subsystem 302, in exchange for a small increase in storage access overhead during normal operation.

Potential disadvantages of storage patrolling 324, particularly in a mobile environment, would include increased power consumption and increased probability of a head crash due to agitation of a hard disk drive. To mitigate these disadvantages, the rate of storage patrolling 324 may be varied to a slower rate when battery power is detected, to reduce the power consumption, and when motion is detected, to reduce the probability of a head crash. The slower rate may also be zero, effectively disabling storage patrolling 324 altogether under those conditions.

Figure 10:
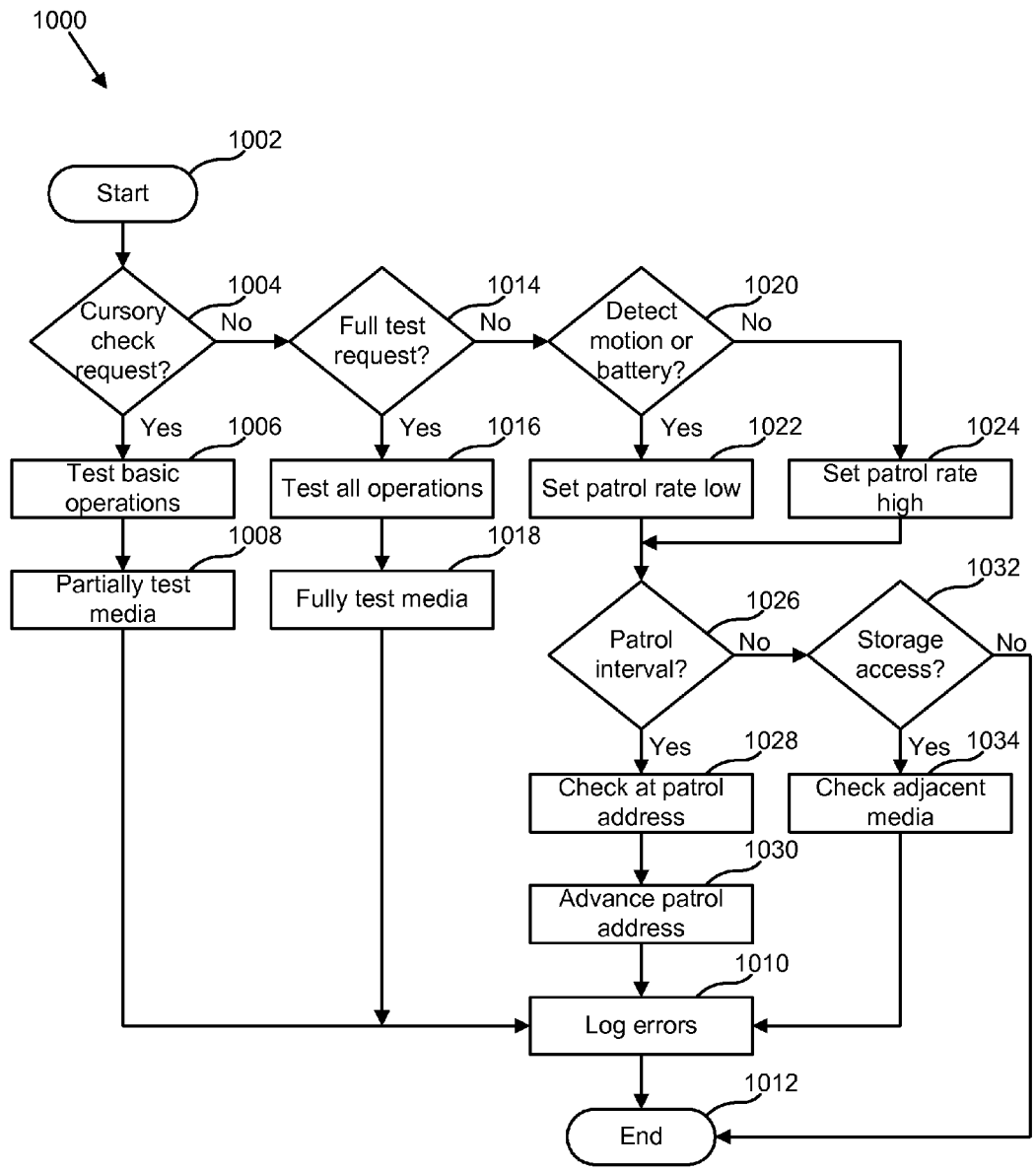
FIG. 10 is a schematic flow chart diagram illustrating one embodiment of a method for computer storage testing in accordance with the present invention.

FIG. 10 is a schematic flow chart diagram illustrating one embodiment of a method 1000 for computer storage testing in accordance with the present invention. The method 1000 starts 1002, determining what action is to be taken. If a cursory check 318 is requested 1004, then basic operational functionality of the storage subsystem 302 is tested 1006, and a partial test of the storage media is performed 1008. The results are logged 1010 in the storage log 306 and the method 1000 ends 1012. If a comprehensive test 320 is requested, then the complete operational functionality of the storage subsystem 302 is tested 1016, and a full test of the storage media is performed 1018. The results are logged 1010 in the storage log 306 and the method 1000 ends 1012.

If physical motion or battery power is detected 1020, then a variable rate of storage patrolling is set 1022 to a low value, otherwise it is set 1024 to a high value. If a patrol time interval as dictated by the variable rate has elapsed 1026, a storage location indicated by the patrol address is checked 1028 for a potential error 906, and then the patrol address is advanced 1030 to a subsequent storage address. The results are logged 1010 in the storage log 306 and the method 1000 ends 1012. If the patrol time interval as dictated by the variable rate has not elapsed 1026, and a normal storage access is made 1032, then adjacent storage media is checked 1034. The results are logged 1010 in the storage log 306 and the method 1000 ends 1012. The method 1000 starts 1002 again, repeating the foregoing steps in piecemeal fashion, eventually wrapping back to the initial patrol address and repeating the process indefinitely in the background during normal operation.

Figure 11:
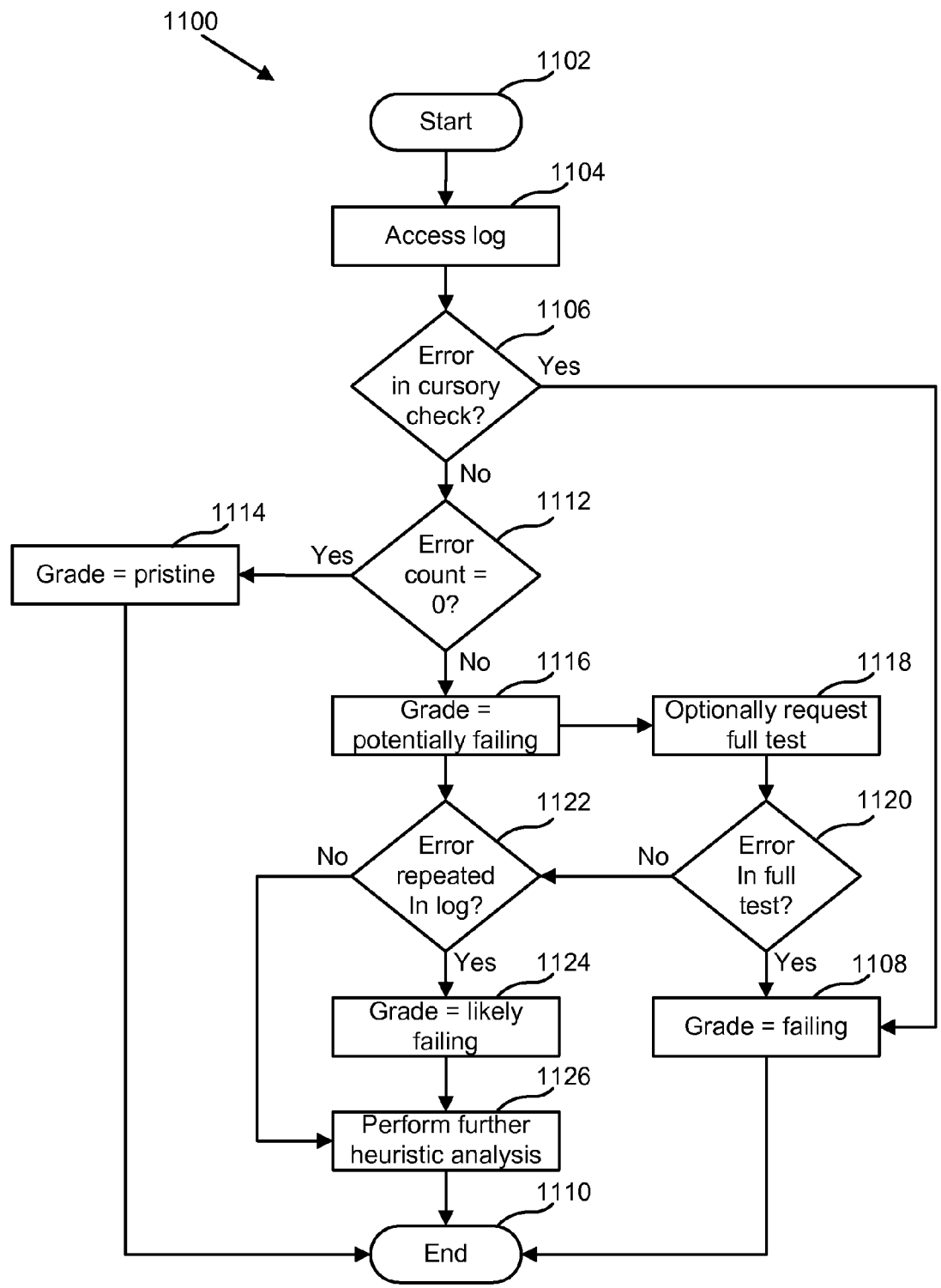
FIG. 11 is a schematic flow chart diagram illustrating one embodiment of a method for computer storage operating condition grading in accordance with the present invention.

FIG. 11 is a schematic flow chart diagram illustrating one embodiment of a method 1100 for computer storage operating condition grading in accordance with the present invention. The method 1100 starts 1102 and the storage log 306 is accessed 1104. If the cursory check 318 experiences 1106 a failing check 602, then the storage system 302 is graded 1108 as failing and the method 1100 ends 1110. If the cursory check 318 does not experience 1106 a failing check 602 and the storage error count 308 in the storage log 306 is zero 1112, then the storage system 302 is graded 1114 as pristine and the method 1100 ends 1110. If the cursory check 318 does not experience 1106 a failing check 602 and the storage error count 308 in the storage log 306 is not zero 1112, then storage system 302 is graded 1114 as potentially failing. At that point a comprehensive test 320 including a full media test may be requested 1118. If the comprehensive test 320 does experience 1120 a failing check 704, the storage system 302 is graded 1108 as failing and the method 1100 ends 1110. If the comprehensive test 320 does not experience 1120 a failing check 704, then one or more heuristics 328 may be employed. For example, if the same storage address appears repeatedly 1122 within the failing storage address history 310 in the storage log 306, then the storage system 302 is graded 1124 as likely failing. In addition, other heuristics 328 may be performed 1126 to further refine the precision and accuracy of the operating condition grade, and then the method 1100 ends 1110.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a storage log module that logs error information regarding any error in a storage subsystem that occurs during normal operation of the storage subsystem;
    a storage test module that performs a cursory check of the storage subsystem as requested by a user; and
    a storage diagnostic module that
        provides a grade of the operating condition of the storage subsystem on an operating condition scale having at least three grades ranging from pristine to failing with at least one intermediate grade, the grades based at least in part upon the error information logged and upon results of the cursory check, and
        instructs the storage test module to perform a comprehensive test of the storage subsystem according to the grade provided, upon request by a user
    wherein the storage log module, storage test module, and storage diagnostic module comprise one or more of circuitry and executable code, the executable code stored on non-transitory computer-readable storage media.

2. The apparatus of claim 1, wherein the storage subsystem is graded as pristine if no error has been logged and no error was detected by the cursory check, as potentially failing if any error has been logged but no error was detected by the cursory check, and as failing if any error was detected by the cursory check.

3. The apparatus of claim 2, wherein the comprehensive test of the storage subsystem, including a full media test, is performed upon request by the user if the storage subsystem was graded as potentially failing.

4. A system comprising:
    a storage subsystem;
    a storage log module that logs error information regarding any error in the storage subsystem that occurs during normal operation of the storage subsystem;
    a storage test module that performs a cursory check of the storage subsystem as requested by a user; and
    a storage diagnostic module that
        provides a grade of the operating condition of the storage subsystem on an operating condition scale having at least three grades ranging from pristine to failing with at least one intermediate grade, the grades based at least in part upon the error information logged and upon results of the cursory check, and
        instructs the storage test module to perform a comprehensive test of the storage subsystem according to the grade provided, upon request by a user; and
    a computer, having access to the storage subsystem, that incorporates the foregoing modules.

5. The system of claim 4, wherein the storage subsystem is graded as pristine if no error has been logged and no error was detected by the cursory check, as potentially failing if any error has been logged but no error was detected by the cursory check, and as failing if any error was detected by the cursory check.

6. The system of claim 5, wherein the comprehensive test of the storage subsystem, including a full media test, is performed upon request by the user if the storage subsystem was graded as potentially failing.

7. The system of claim 4, wherein the storage test module further checks adjacent media for errors during normal operation of the storage subsystem.

8. The system of claim 4, wherein the storage test module further patrols the storage subsystem during normal operation such that a full media test is repeatedly performed in an address-wise piecemeal fashion over time.

9. The system of claim 4, wherein the computer is mobile.

10. The system of claim 9, wherein the storage test module further patrols the storage subsystem during normal operation such that a full media test is repeatedly performed in an address-wise piecemeal fashion at a variable rate over time.

11. The system of claim 10, wherein the variable rate is reduced when the computer is operating on battery power.

12. The system of claim 10, wherein the variable rate is reduced when motion of the computer is detected.

13. The system of claim 4, wherein the storage subsystem comprises one or more hard disk drives.

14. A computer program product comprising a non-transitory computer readable storage medium having computer usable program code executable to perform operations, the operations of the computer program product comprising:
    logging error information regarding any error in a storage subsystem that occurs during normal operation of the storage subsystem;
    performing a cursory check of the storage subsystem as requested by a user; and
    providing a grade of the operating condition of the storage subsystem on an operating condition scale having at least three grades ranging from pristine to failing with at least one intermediate grade, the grades based at least in part upon the error information logged and upon results of the cursory check; and
    performing a comprehensive test of the storage subsystem according to the grade provided, upon request by a user.

15. The computer program product of claim 14, wherein the storage subsystem is graded as pristine if no error has been logged and no error was detected by the cursory check, as potentially failing if any error has been logged but no error was detected by the cursory check, and as failing if any error was detected by the cursory check.

16. The computer program product of claim 15, wherein the comprehensive test of the storage subsystem, including a full media test, is performed upon request by the user if the storage subsystem was graded as potentially failing.

17. A machine-implemented method comprising the steps of:
    logging error information regarding any error in a storage subsystem that occurs during normal operation of the storage subsystem;
    performing a cursory check of the storage subsystem as requested by a user;
    providing a grade of the operating condition of the storage subsystem on an operating condition scale having at least three grades ranging from pristine to failing with at least one intermediate grade, the grades based at least in part upon the error information logged and upon results of the cursory check; and
    performing a comprehensive test of the storage subsystem according to the grade provided, upon request by a user.

18. The method of claim 17, wherein the storage subsystem is graded as pristine if no error has been logged and no error was detected by the cursory check, as potentially failing if any error has been logged but no error was detected by the cursory check, and as failing if any error was detected by the cursory check.

19. The method of claim 18, wherein the comprehensive test of the storage subsystem, including a full media test, is performed upon request by the user if the storage subsystem was graded as potentially failing.

20. The method of claim 17, wherein the cursory check comprises basic operational testing of the storage subsystem and a partial media test.

21. The method of claim 17, further comprising a step of checking adjacent media for errors during normal operation of the storage subsystem.

22. The method of claim 17, further comprising a step of patrolling the storage subsystem during normal operation such that a full media test is repeatedly performed in an address-wise piecemeal fashion over time.

23. The method of claim 17, wherein the step of grading further comprises a heuristic based upon the error information logged.

24. The method of claim 23, wherein the heuristic infers a poorer operating condition of the storage subsystem if the error information logged exhibits a repeated failure.

* * * * *